Patented Oct. 30, 1951

2,573,253

UNITED STATES PATENT OFFICE 2,573,253

PROCESS FOR PRODUCING CUPRIC AMMONIUM BORATE SOLUTIONS

Eduard Farber, Washington, D. C., assignor to Timber Engineering Company, Washington, D. C., a corporation of Delaware No Drawing. Application June 21, 1950, Serial No. 169,521

5 Claims. (Cl. 23—59)

This invention relates to cupric ammonium borate solutions. More particularly, the invention relates to a process whereby such solutions may be prepared directly from metallic copper and boric acid.

Ammoniacal solutions containing cupric ammonium borate are useful as fungicides, for the preservation of wood, and for numerous other purposes. These solutions are of value for the reason that they serve not only to afford protection against destructive biological agents, but also to inpart resistance to flammability to materials treated therewith. As a consequence of the extreme weakness of boric acid, heretofore no method has been known whereby such solutions might be produced from metallic copper. It has previously been considered necessary to employ solution of preformed cupric hydroxide normally prepared by alkalizing cupric salt solutions to produce cupric ammonium borate. Ammoniacal cupric ammonium borate solutions so produced are expensive and despite elaborate precautions are normally contaminated with foreign ion-forming materials.

In accordance with this invention, it has been discovered that cupric ammonium borate solutions may be prepared by contacting with a free oxygen containing gas metallic copper present in excess in an aqueous ammoniacal solution of boric acid, said aqueous ammoniacal solution containing from about 1 to about 4 chemical equivalents of ammonia per liter, and at least about 0.25 chemical equivalents of boric acid for each chemical equivalent of ammonia, said solution containing no more than about 2.5 chemical equivalents of boric acid per liter.

It is essential and critical to the invention that the ratio of equivalents of boric acid to equivalents of dissolved ammonia in the reaction mixture be at least about 0.25. In this lower limit is not attained, the amount of dissolved copper is reduced below about 0.3 equivalents per liter which can be considered as the lowest of the desirable concentrations. A preferred range for this ratio is from about 0.25 to about 2. If the specified preferred upper limit of 2.0 for the ratio of equivalents of boric acid to equivalents of dissolved ammonia is exceeded, no additional reaction results from the excess quantities of boric acid employed.

A further practical limitation to the process resides in the total concentration of boric acid present in the reaction mixture. The presence of more than about 2.5 equivalents of dissolved boric acid per liter of the reaction mixture results in the formation of sludge during the reaction with an attendant decrease in efficiency of the process and yield of desired product.

It is further essential and critical to the success of the invention that there be present in the reaction mixture from about 1.0 to about 4 equivalents of dissolved ammonia. If less than this amount of dissolved ammonia is employed, the concentration of dissolved copper in the product is too low. The utilization of a concentration of ammonia in excess of about four normal is impractical because it is procedurally and economically not feasible to maintain a greater concentration in the reaction mixture.

The reaction may desirably be effected at a temperature within the range of about 5° C. to about 40° C. although these limits may be varied somewhat. Preferably the reaction is carried out at from about 15° C. to about 30° C. Operation at temperatures in excess of 40° C. results in the loss of excessive amounts of ammonia and in sludge formation.

The reaction may be effected by passing through the reaction mixture comprising aqueous ammonia, dissolved boric acid, and metallic copper, oxygen or a free oxygen containing gas. Air is preferred. The aeration may be effected at any desired rate. Generally speaking, however, there should be present in the reaction mixture an excess of free oxygen, that is, the rate of supply of oxygen should exceed the rate at which it is consumed by the copper. It will be apparent that the most desirable rate will vary with the free oxygen containing gas employed and with the effectiveness of the contact between the reactants. A suitable rate of introduction when air is employed is from about 6 to about 15 cubic feet per hour per liter of reaction mixture. A preferred rate of aeration when air is employed is from about 7 to 10 cubic feet per hour per liter of reaction mixture. When oxygen is employed, these rates of introduction are desirably about 1/5 as great both with respect to the over-all and the preferred rates.

The metallic copper employed in the process of this invention may be in any desired form. Copper sheets or copper wire may be utilized. Copper in the form of filings, turnings, or other discreet particles may be employed. Copper plated metal scrap may be used if desired. It is preferred that the copper be in such form as to present a relatively large surface area to the reaction medium. Inasmuch as the reaction depends for completion upon the continued presence of metallic copper in the reaction mixture, it is necessary that the copper be present in stoichiometric excess throughout the reaction.

The reaction may be effected in a variety of ways. If desired the reaction may be initiated in a reaction medium containing a relatively small proportion of boric acid, and additional amounts of boric acid added as the reaction proceeds. This method is particularly advantageous when relatively large amounts of boric acid are employed. Alternatively, the entire amount of boric acid may be added at the beginning of the reaction. In a similar manner, a boric acid may be dissolved in ammoniacal solution containing only about 1 equivalent of ammonia per liter and additional ammonia added during the reaction period. Alternatively, a measured amount of ammonia may be admixed with the air or oxygen introduced into the reaction mixture by the aeration system.

It will be appreciated that the process may be effected either batch-wise or continuously. A continuous method of operation similar to that described in Farber application Serial No. 95,082, filed May 24, 1949, may be employed.

When it is desired to obtain solutions containing maximum dissolved copper content, concentrations of ammonia approaching the maximum permissible limit as set forth hereinbefore are utilized, together with correspondingly high concentrations of boric acid. Likewise, when it is desired to produce a product solution less concentrated with respect to dissolved copper, lower concentrations of ammonia and/or boric acid may be employed.

It will be understood that all of the various boric acids may be employed in this invention. Orthoboric acid is preferred. However, other boric acids such as metaboric acid and tetraboric acid may be utilized. Under the reaction conditions employed, both meta and tetra boric acids rehydrate to the orthoboric form. Hence the same product is obtained irrespective of the specific boric acid starting material utilized. As a consequence of this phenomenon of rehydration, the meta- and tetraboric acids should be employed in such an amount that there is provided the aforementioned essential relative and absolute concentration of boric acid equivalents in the reaction mixture. Thus, for the purpose of this invention ⅓ of the molecular weight thereof is a chemically equivalent amount of metaboric acid and ½ of the molecular weight thereof may be considered a chemically equivalent amount of tetraboric acid.

One of the salient features of this invention and one of the unexpected aspects thereof resides in the fact that the process of the reaction disclosed may be substantially completed in not more than about one hour and normally in not more than about 30 minutes. A preferred reaction time for normal batch operations is about 30 minutes to about 45 minutes.

Having described the invention, the following examples are offered to illustrate the practice thereof.

EXAMPLE I

A quantity of about one normal ammonium hydroxide was prepared and divided into 3 equal portions which were placed in open cylindrical vessels. These portions of about 1 normal ammonium hydroxide were rendered respectively 2.0, 2.5 and 3.5 normal in boric acid content by the dissolution of boric acid therein. Accordingly the ratios of equivalents of dissolved ammonia to equivalents of dissolved boric acid were respectively about 2.0, 2.5 and 3.5. To each of these reaction mixtures was added a stoichiometric excess of copper wire particles and the mixtures were then aerated at a temperature of about 20° C. by passing air therethrough at the rate of about 8 cubic feet per hour per liter of reaction mixture for a period of about 30 minutes.

In each instance a product comprising an ammoniacal solution of cupric ammonium borate was obtained. The product obtained from the reaction mixture which was about 2.0 normal with respect to boric acid contained about 0.45 equivalents of dissolved copper per liter, whereas the product from the reaction mixtures which was about 2.5 normal with respect to boric acid contained about 0.30 equivalents of dissolved copper per liter and the product obtained from the reaction mixture 3.5 normal with respect to boric acid contained about 0.29 equivalents of dissolved copper per liter.

The results of this experiment are set forth in Table I.

TABLE I

| Sample No. | Ratio, $B_2O_3/NH_3$ | Copper Dissolved |
|---|---|---|
| 1 | 2.0 | .45 |
| 2 | 2.5 | .30 |
| 3 | 3.5 | .29 |

All samples originally about 1N with respect to dissolved ammonia.

It is apparent from the foregoing table that although optimum concentrations of boric acid and ammonia are employed, when the ratio of boric acid to ammonia increases in excess of about 2 no additional beneficial result is obtained. On the contrary, increasing the relative ratio of boric acid to ammonia to 2.5 and higher serves actually to decrease the total yield as measured by the amount of dissolved copper in the product, in part as a result of sludge formation.

The foregoing example illustrates the specific yields which are obtained under the procedures defined when the ammonia concentration is maintained at about 1 normal. Similar results are obtained, however, when the ammonia concentration is varied throughout the operable range of about 1 to 4 normal. The same critical limitation with respect to the concentration and relative proportion of boric acid occurs throughout the process of this invention.

EXAMPLE II

Four equal portions of about 2 normal ammonium hydroxide were prepared. These four portions were respectively rendered 2N, 1N, 0.5N, 0.4N, 0.25N and 0.1N, with respect to boric acid by the dissolution of orthoboric acid therein. The ratio of boric acid to ammonia in each of these instances was therefore 1, 0.5, 0.25, 0.20, 0.12 and 0.05. Particles of copper screen in stoichiometric excess were added to the reaction mixture. Aeration of the samples to produce ammonium borate was carried out in the same manner as described in Example I. A product consisting of an aqueous ammoniacal solution of cupric ammonium borate was obtained in each instance. The concentration of dissolved copper in each of the solutions was respectively 0.41, 0.47, 0.33, 0.25, 0.22, and 0.19 equivalents per liter. These data are set forth in Table II.

TABLE II

*Concentration eq./liter*

| Sample No. | Boric Acid | Copper Dissolved |
|---|---|---|
| 1 | 2 | 0.41 |
| 2 | 1 | 0.47 |
| 3 | 0.5 | 0.33 |
| 4 | 0.4 | 0.25 |
| 5 | 0.25 | 0.22 |
| 6 | 0.10 | 0.19 |

It will be noted that in this case likewise the reduction of ratio of equivalents of boric acid to equivalents of dissolved ammonia in the original reaction mixture below about 0.25 resulted in unsatisfactory yields of cupric ammonium borate.

A control test in which boric acid was employed without ammonia failed to effect any dissolution of the copper present. Likewise, control tests in which only copper and ammonia without boric acid were employed failed to effect dissolution of copper in an amount within the practical limits hereinbefore defined.

EXAMPLE III

An aqueous solution about 4 normal with respect to ammonia was prepared. This solution was rendered about 2 normal with respect to boric acid by the dissolution of orthoboric acid therein. Upon aeration of this reaction mixture in the same manner and for the same time as described in Example I there was produced a solution which contained cupric ammonium borate and in which the concentration of dissolved copper was 0.845 normal.

A salient feature of this invention is the utilization of the process thereof in conjunction with arsenious acid to form a mixed cupric ammonium borate-arsenite material which is of particular value as a fungicide. When arsenious acid is used in conjunction with boric acid in the process, the total number of equivalents of boric acid and arsenious acid should fall within the range hereinbefore specified, for boric acid alone. This example is illustrative of this aspect of the invention.

EXAMPLE IV

There was dissolved in a portion of 2 normal ammonium hydroxide contained in an open vessel 0.5 equivalents per liter of arsenious oxide and 0.2 equivalents per liter of boric acid. In this solution was placed copper wire in stoichiometric excess with respect to the arsenious oxide present.

Air was passed through the reaction mixture at the rate of about 7 cubic feet per liter of the original reaction solution for a period of about 30 minutes.

At the termination of the reaction period a product containing 0.42 chemical equivalents of copper per liter was obtained.

This application is a continuation-in-part of Farber application Serial No. 95,082, filed May 24, 1949.

What is claimed is:

1. A process for the production of cupric ammonium borate solutions which comprises contacting with a free oxygen containing gas, at a temperature of from about 5° C. to about 40° C. an aqueous ammoniacal boric acid solution having metallic copper in contact therewith, said aqueous ammoniacal boric acid solution containing from about 1 to about 4 equivalents of dissolved ammonia per liter and at least about 0.25 equivalents of dissolved boric acid per equivalent of dissolved ammonia, said solution containing no more than about 2.5 equivalents of boric acid per liter, said metallic copper being present in stoichiometric excess throughout the reaction, said free oxygen containing gas being supplied at a rate adequate to provide, at all times, an excess of free oxygen in the reaction mixture.

2. A process of claim 1 which is effected at a temperature of from about 15 to about 30° C.

3. A process of claim 1 on which the free oxygen containing gas is air.

4. The process of claim 3 in which air is passed through the aqueous ammoniacal solution at a rate of from about 7 to about 10 cubic feet per hour per liter thereof, for a period of from about 30 to about 45 minutes.

5. The process of preparing a cupric ammonium borate-arsenite solution which comprises passing a free oxygen containing gas at a temperature of from about 5° C. to about 40° C. through an aqueous ammoniacal solution of arsenious oxide and boric acid having metallic copper in contact therewith, said aqueous ammoniacal solution comprising having dissolved therein from about 1 to about 4 equivalents of ammonia per liter and at least about 0.25 combined total equivalents of both dissolved arsenious oxide and dissolved boric acid per equivalent of dissolved ammonia, the combined total equivalents of dissolved arsenious oxide and boric acid not exceeding about 2.5 equivalents per liter, said metallic copper being present throughout the reaction in stoichiometric excess, said free oxygen containing gas being supplied at a rate adequate to provide, at all times, an excess of free oxygen in the reaction mixture.

EDUARD FARBER.

REFERENCES CITED

The following references are of record in the file of this patent:

UNITED STATES PATENTS

| Number | Name | Date |
|---|---|---|
| 884,298 | Schaefer | Apr. 7, 1908 |
| 1,057,076 | Monseur | Mar. 25, 1913 |
| 1,082,658 | Somermeier | Dec. 30, 1913 |
| 1,620,152 | Curtin | Mar. 8, 1927 |
| 2,149,284 | Gordon | Mar. 7, 1939 |
| 2,263,594 | Rushton | Nov. 25, 1941 |

FOREIGN PATENTS

| Number | Country | Date |
|---|---|---|
| 446,373 | Great Britain | Apr. 29, 1936 |
| 782,795 | France | Dec. 17, 1934 |